July 8, 1952
G. PIELSTICK
2,602,901
PROPULSION POWER PLANT
Filed Dec. 29, 1949
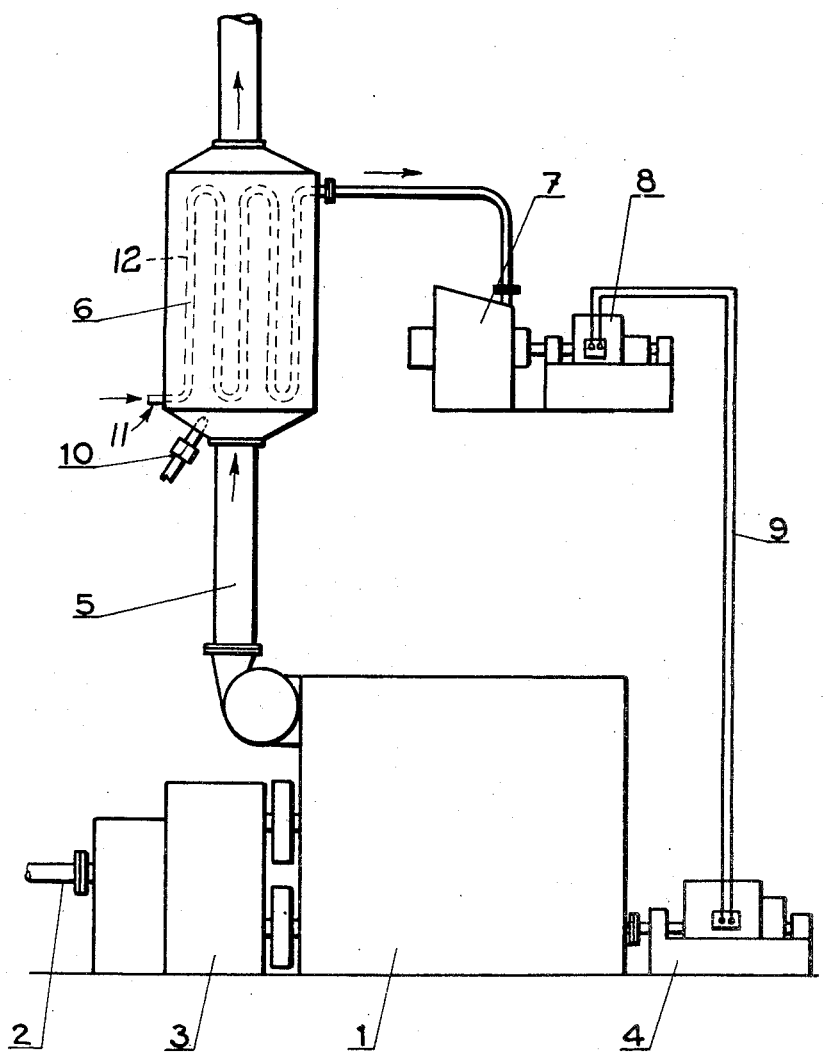
INVENTOR
GUSTAV PIELSTICK
BY
Mock&Blum
ATTORNEYS Patented July 8, 1952

2,602,901

UNITED STATES PATENT OFFICE 2,602,901

PROPULSION POWER PLANT

Gustav Pielstick, Saint-Germain-en-Laye, France

Application December 29, 1949, Serial No. 135,563
In France December 30, 1948

3 Claims. (Cl. 290—2)

This invention relates to power-plants, especially for the propulsion of ships, and more particularly power-plants of the type comprising an engine group, such as a multi-crankshaft engine group; at least one crankshaft of which has an electric generator coupled thereto.

Power-plants are known particularly adapted for the propulsion of ships, comprising an engine group having a plurality of parallel spaced crankshafts projecting from both ends thereof, all of said crankshafts being releasably coupled at one end thereof with a load, such as a ship's propeller shaft, through an interposed common speed-reducer, and at least one of said crankshafts being releasably coupled at the opposite end with a rotary electric machine usable either as a generator to supply electric current, as when the ship is in harbour for cargo-handling and similar requirements, or as a motor, when supplied with electric power from an external source in order either to participate in the power-plant's load-driving function, or to start the power-plant from an idle condition. The expression "rotary electric machine" is used in the specification and claims to designate an electric generator adapted when desired to function as a motor.

It is a general object of the present invention to provide an improvement in a power-plant of the type just described, whereby a complete self-contained and autonomous power-plant system is obtained having great advantages of economy and versatility over analogous systems of prior art.

According to this invention, the said external source of electric power for supplying the said rotary electric machine when used as a motor is constituted by a separate generating set adapted to be driven at least in a major proportion by the heat content of the exhaust gases from said engine group.

Thus, my present invention may be described as comprising a combustion engine group having at least one crankshaft releasably coupled at one of its projecting ends with a speed-reducer driving a load, a rotary electric machine releasably coupled with said crankshaft at its opposite projecting end, a generating set comprising a heat-engine unit and a generating unit coupled thereto, heat-recovery means for driving said heat-engine unit of the generating set from the heat content of the exhaust gases of said combustion engine, and electric connections from said generating unit to electric machine for energizing it for use as a motor.

The heat-recovery means used preferably comprise according to the invention a waste-heat boiler using the exhaust gases of the combustion engine as its heating medium and the heat-engine unit of the generating set accordingly comprises a steam turbine.

According to another feature of the invention, said waste-heat boiler is preferably equipped with auxiliary firing means such as an oil burner or the like, whereby the turbine unit of the generating set may be operated when the main power-plant is idle, and thus used to start said main power-plant in operation through the medium of the electric machine and whereby also, in the normal operation of the power-plant, a supplement of power may be obtained for driving the load through the use of said auxiliary fuel-firing means.

It has been found that where the engine group of the main power-plant comprises supercharged four-cycle diesel engines, the waste heat of the exhaust gases, allowance having been made for the efficiency ratio of the waste-heat boiler and the losses over the electric circuit, makes possible a 10% increase in the propulsive power of the power-plant. In other words, recovery of such waste exhaust heat in a boiler and the use of a generating set according to the invention will reduce the fuel consumption of the power plant by 10%.

The invention further comprises the method of operating a power-plant of the type described including an engine group having at least one crankshaft releasably coupled at one of its ends with a reducer driving a load and at its other end with a rotary electric machine, said method comprising recovering a substantial part of the waste heat content of the exhaust gases of said engine, converting said heat into electric power, and feeding said electric power back to said rotary electric machine to participate in the load-driving function of said engine group.

An exemplary embodiment of the invention will now be described with reference to the accompanying diagrammatic drawing which illustrates a complete power-plant according to the invention.

As shown in the drawing, an engine group 1 preferably of the multi-crankshaft diesel type for instance in my co-pending application, Serial Number 135,561, has all of its crankshafts, only two of which are shown in the drawing, releasably coupled through individual clutch means with a common reducer gearing 3 the output of which drives a load shaft such as a ship's propeller shaft 2. The lower one of the crankshafts is coupled at its opposite projecting end, through a clutch as shown, with a rotary electric machine 4, i. e. an electro-dynamic rotary apparatus adapted to be operated both as an electric generator and as a motor depending on requirements.

The exhaust gases from the engine group 1 are conveyed through a conduit 5 to a waste-heat boiler 6 of any suitable type in which they serve to generate steam which is used to operate the turbine unit 7 of a generating set 7—8 the generating unit 8 of which is thus caused to supply electric power through the electric connections 9 to the electric machine 4 coupled with the engine group 1.

A fuel-burner 10 or the like is shown as provided for auxiliary heating of the boiler 6 for the purposes described. Thus, the burner 10 may be used to fire the boiler when the main power-plant 1 is idle, sufficiently to set the electric machine or motor 4 running and thus start the main engine 1. The boiler may be of any conventional type and comprise for instance a series of tubular heating means 12 connected to an inlet 11.

It will be obvious to those familiar with the art that the installation described is capable of rendering many and invaluable services, especially owing to its extreme flexibility and versatility in adjusting itself to various circumstances and requirements.

What I claim is:

1. In a power-plant in combination, a combustion engine group with a plurality of parallel spaced crankshafts, a reducer, clutch means coupling all of said crankshafts at one end thereof to said reducer, said reducer being drivingly coupled to a load, at least one rotary electric machine coupled to at least one of said crankshafts at the opposite end thereof, a waste-heat boiler interposed in the exhaust of said engine group to generate steam from the waste heat content of said exhaust gases, auxiliary fuel-burning means for said boiler, a generating set including a steam turbine and a generating unit coupled thereto, steam connections from said boiler to said turbine and electrical connections from the output of said generating unit to said rotary electric machine to energize said machine acting as an electric motor.

2. In combination with a power-plant of the type described including a combustion engine group having at least one crankshaft releasably coupled at one end to a reducer driving a load and a rotary electric machine coupled to the other end of said crankshaft, said machine being adapted to operate at will as a generator and as a motor, a generating set formed by a turbine and an electric machine, means for the recovery of the waste heat of the exhaust gases of the engine group, said recovery means consisting of a steam-boiler feeding said turbine, and electric circuit connections from the output of said generating set to said rotary electric machine for operating said latter machine as a motor.

3. The power-plant combination of claim 2 wherein auxiliary fuel firing means are provided in said boiler, and are adapted to heat it and to operate the turbine even when no exhaust gases are delivered from the engine.

GUSTAV PIELSTICK.

REFERENCES CITED

The following references are of record in the file of this patent:

UNITED STATES PATENTS

| Number | Name | Date |
|---|---|---|
| 830,011 | Schroeder | Sept. 4, 1906 |
| 891,350 | Mascord | June 23, 1908 |
| 981,081 | Hammond | Jan. 10, 1911 |
| 1,006,477 | Guy | Oct. 24, 1911 |
| 1,701,365 | Herr | Feb. 5, 1929 |
| 1,737,791 | Geisen | Dec. 3, 1929 |
| 1,926,849 | Gray | Sept. 12, 1933 |
| 1,978,837 | Forsling | Oct. 30, 1934 |
| 2,213,045 | Kuhns | Aug. 25, 1940 |
| 2,215,646 | Kuhns | Sept. 24, 1940 |
| 2,405,676 | Strub | Aug. 13, 1946 |

FOREIGN PATENTS

| Number | Country | Date |
|---|---|---|
| 97,266 | Sweden | Apr. 27, 1937 |
| 537,483 | Great Britain | June 24, 1941 |